No. 802,537. PATENTED OCT. 24, 1905.
A. UREN.
SWIVEL CONNECTION.
APPLICATION FILED SEPT. 22, 1904.
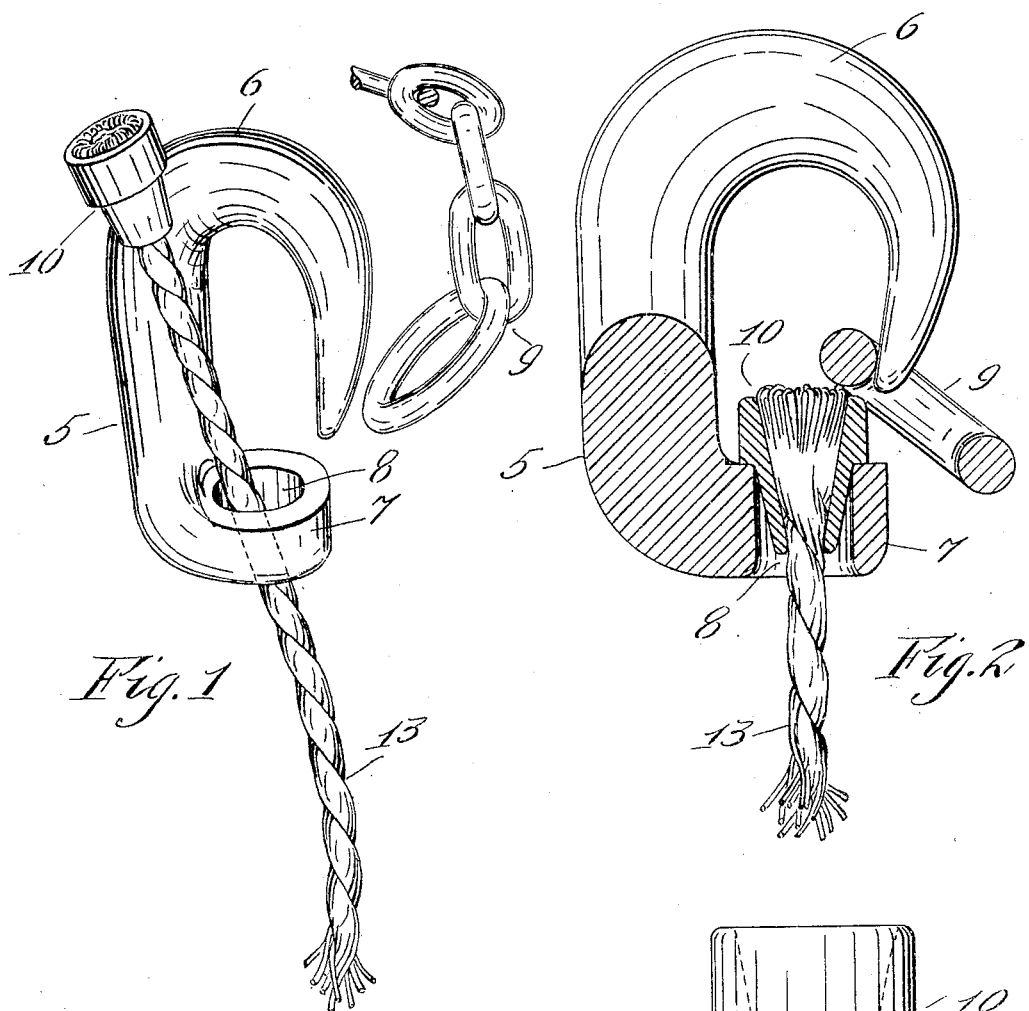
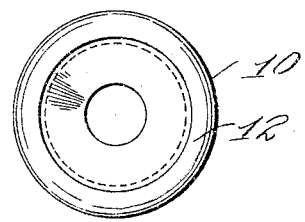
Fig. 4.
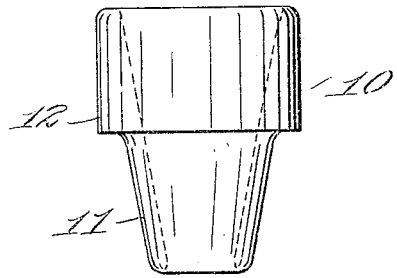
Fig. 3.
WITNESSES:
Paul A. Vallot
Dunham D. Patton
INVENTOR.
Andrew Uren
BY Frank E. Adams
ATTORNEY.

UNITED STATES PATENT OFFICE.

ANDREW UREN, OF SEATTLE, WASHINGTON.

SWIVEL CONNECTION.

No. 802,537.      Specification of Letters Patent.      Patented Oct. 24, 1905.

Application filed September 22, 1904. Serial No. 252,257.

*To all whom it may concern:*

Be it known that I, ANDREW UREN, a citizen of the United States of America, and a resident of the city of Seattle, in the county of King and State of Washington, have invented certain new and useful Improvements in Swivel Connections, of which the following is a specification.

My invention relates to a swivel for connecting a rope with an attaching member; and the objects attained thereby are the production of a simplified and inexpensive swivel connection of the above class embracing but few parts and embodying essential features of adaptability, general efficiency, and durability.

The above-mentioned and other desirable objects are attained by the constructions, combination, and arrangement of parts, as disclosed on the accompanying drawings, set forth in this specification, and pointed out in the appended claims.

With reference to the drawings filed herewith and bearing like reference characters for corresponding parts throughout, Figure 1 is a view in perspective, showing the improved connection with the rope-socket removed from its seat and a section of chain about to be engaged with the attaching member. Fig. 2 is a side elevation, in partial section, showing the socket in place and a link of a chain engaged with the attaching member. Fig. 3 is a side elevation of the socket removed, and Fig. 4 is an end view of the same.

Referring to the drawings, reference character 5 indicates the attaching member, consisting of an open link and formed with a hooked portion 6, tapered at one extremity to a blunt point, and a base portion 7, connected at one side with the stem of the hooked portion and extending therefrom so as to lie adjacent said point at the opposite side, but at suitable separation therefrom, to provide an entrance or space of suitable width to receive the link of a chain, as 9. This base portion is flattened on the inner side and provided with an aperture 8, extending from said flattened surface to the opposite side of said portion and formed of a uniform diameter throughout.

Reference character 10 indicates the rope-socket of the swivel, which comprises a stem part 11 of suitable diameter to fit rotatably in the aperture 8 of the attaching member 5 and a head part 12 at one end of said stem, which bears against the flattened surface surrounding said aperture and prevents said member from moving in one direction from said socket. This head part is also adapted to block the entrance to said member, it being of suitable diameter and thickness for the side thereof to lie approximately across said entrance when the socket is in place on the base 7.

The socket is left free in its seat, so that it can be readily moved clear of the entrance of the attaching member by moving it inwardly from the base 7, and the stem part 11 of the socket is formed with the periphery tapering, so that it will enter the aperture 8 in said base when the socket is drawn toward its seat and, furthermore, prevent dirt or grit from being caught between said periphery and the wall of said aperture and binding the swivel. This stem part is formed shorter than the length of aperture 8, so that when the socket is in place the outer end of said stem will be protected by the wall about said aperture from contact with stones or the like when working the swivel, and thereby insure its form for more ready reseating of the socket when disengaged from the base. The socket 10 is formed with the bore tapering inwardly from the outer face of the head, and the rope 13 is secured therein in any suitable manner— as, for example, in the case a wire rope is employed one end portion thereof is passed through the bore from the restricted end and the wires in said portion then separated and contorted to effect an enlargement, which is drawn back into the bore and melted babbitt poured thereabout.

This invention is directed for use in logging or like heavy work where a swivel connection between a hauling or lifting rope and the object to be moved is desired, so that the object will be free to rotate without danger of twisting the rope. When desired to apply the rope to snake a log, for example, the attaching member and socket are moved apart to clear the latter from the entrance to the former. This can be done by moving the member from the socket along the rope or moving the socket from its seat. The attaching member is then hooked over a chain or suitable holdfast engaged with the log, and the hauling-rope is then drawn upon. As the socket approaches the base of the attaching member the taper of the stem part will insure it taking a proper position on its seat, where it serves to block the entrance to said member, and consequently prevents accidental disengagement of the attaching member from the holdfast, while permitting said member to turn freely on the socket as the log tumbles about. From the foregoing it will be apparent that it is unnecessary to reseat the socket before drawing on the rope for hauling. Consequently the horses or engine employed to draw the log can be started immediately after the attaching member is engaged with the holdfast.

This swivel connection comprises but few parts. It is inexpensive of construction, durable in use, and can be readily attached to and detached from a holdfast or the like. Furthermore, it permits of the attaching member turning freely without danger of twisting the rope and possesses no removable parts likely to be lost or misplaced.

Having thus described my invention, what I claim as new, and desire to secure by Letters Patent of the United States of America, is—

1. A swivel comprising an attaching member formed with a base, and a hooked part arranged with the free extremity opposed to said base, but spaced therefrom, and a rope-socket engaged with said base but rotatable thereon and adapted to normally block the space between said extremity and the base, said socket being movable from normal position to clear said space.

2. A swivel comprising an attaching member formed with a base having an aperture, and a hooked part arranged with the free extremity adjacent said base, a rope-socket formed with a stem part rotatably fitting in said aperture, and a head part adapted to normally block the space between said extremity and the base, said socket being movable from the base to clear said space.

3. In a swivel connection, the combination of an attaching member formed with a base having an aperture, and a hooked part extending over the base and arranged with the free extremity adjacent the inner face thereof, a rope-socket formed with a stem part rotatably fitting in said aperture, and a head part resting upon said face and adapted to normally block the space between said extremity and the base, said socket being free for movement from the base in one direction to clear said space, and a rope secured in said socket and extending in the opposite direction to said free movement.

4. In a swivel connection, the combination of an attaching member formed with a base having an aperture, and a hooked part extending over the base from one side and arranged with the free extremity adjacent the opposite side, a rope-socket formed with a stem part rotatably fitting in said aperture, and a head part bearing against the inner face of said base and lying adjacent said extremity, said socket being free for movement from said face, and a rope having one end portion secured in said socket.

Signed at Seattle, Washington, this 10th day of September, 1904.

ANDREW UREN.

Witnesses:
ERNEST B. HERALD,
ARLITA ADAMS.